United States Patent
Saijo et al.

(10) Patent No.: US 7,206,894 B2
(45) Date of Patent: Apr. 17, 2007

(54) MICROCOMPUTER APPLICATION SYSTEM, MICROCOMPUTER, SIGNAL PROCESSING SYSTEM AND SIGNAL PROCESSING LSI

(75) Inventors: Tokuyuki Saijo, Osaka (JP); Kouji Kitamura, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 346 days.

(21) Appl. No.: 10/793,794

(22) Filed: Mar. 8, 2004

(65) Prior Publication Data
US 2004/0177227 A1    Sep. 9, 2004

(30) Foreign Application Priority Data
Mar. 7, 2003    (JP)    ............... 2003-062092

(51) Int. Cl.
*G06F 12/00*    (2006.01)
(52) U.S. Cl. .............. 711/105; 711/104; 711/102; 711/154; 712/32; 712/35
(58) Field of Classification Search ............... 711/167, 711/105, 102, 103, 104; 712/32, 39, 40, 712/37, 35
See application file for complete search history.

(56) References Cited
U.S. PATENT DOCUMENTS 5,189,598 A * 2/1993 Bolan et al. ............ 361/748
5,677,859 A    10/1997 Kanayama et al.
6,092,148 A    7/2000 Sugita
6,212,620 B1 * 4/2001 Kawasaki et al. ............ 712/32
6,223,279 B1 * 4/2001 Nishimura et al. ............ 712/33
2002/0049888 A1    4/2002 Hertwig et al.

FOREIGN PATENT DOCUMENTS

EP    0741358 A    * 11/1998

OTHER PUBLICATIONS

Maejima et al. "A 16-bit Microprocessor with Multi-Register Bank Architecuture" Jun. 1987.*
IEEE Journal of Solid-State Circuits, vol. 26, No. 11, Nov. 11, 1991, pp. 1586-1592,"A 0.5W 64-Kilobyte Snoopy Cache Memory with Pseudo Two-Port Operation" by Kobayashi et al.*
IBM Technical Disclosure Bulletin, Nov. 1989, vol. 32, No. 6A, pp. 246-248, "Method of Communication Between a PC and a 68000-Based System Using Parallel Ports."*

* cited by examiner

*Primary Examiner*—Pierre-Michel Bataille
(74) *Attorney, Agent, or Firm*—McDermott Will & Emery LLP

(57) ABSTRACT

An external ROM stores a control program PG for controlling a microcomputer. An MPU executes copy processing to copy a high-speed processing part PGM1 stored in the external ROM to a high-speed processing region of an internal RAM. When a fetch address AZ1 specified by the MPU indicates a region of the external ROM in which the high-speed processing part PGM1 is stored, the address translation unit translates the fetch address AZ1 to the address AF of a region of the internal RAM corresponding to the high-speed processing part PGM1.

18 Claims, 14 Drawing Sheets

MICROCOMPUTER APPLICATION SYSTEM, MICROCOMPUTER, SIGNAL PROCESSING SYSTEM AND SIGNAL PROCESSING LSI

BACKGROUND OF THE INVENTION

The present invention relates to a microcomputer application system for executing a program stored in a memory and a technique for a signal processing system.

In recent years, as the operating speed of microcomputers has been increased, microcomputer application systems, represented by built-in microcomputer systems, are required to be operated at higher and higher operating speed. On the other hand, the operating speeds of peripheral circuits such as memories and interfaces have not yet made to be as high as that of microcomputers. Moreover, with increase in the size of software and reduction in development periods, there are an increased number of cases in which a rewritable memory is used as a memory for storing software in order to avoid risks. Furthermore, the configuration of software has become more complicated with increase in the size of software, thus increasing burdens on software developers.

Hereinafter, a known microcomputer application system will be briefly described.

FIG. 8 is a block diagram illustrating a first known example which allows high-speed operation. In FIG. 8, an MPU 51 fetches data of a control program PG in an internal ROM 54 via a bus 53 and then executes the control program. Normally, for a memory in a microcomputer 50, the access speed for data fetch via the bus 53 is optimized. With a configuration shown in FIG. 8, the program PG for controlling the microcomputer 50 can be executed at high speed by high-speed fetch. The internal ROM 54 is formed of, for example, a masked ROM or a rewritable flush ROM for the purpose of avoiding risks.

FIG. 9 is a block diagram illustrating a second known example including a large scale memory. In a configuration shown in FIG. 9, an external ROM 60 is connected to the bus 53. The control program PG is stored in the external ROM 60. The MPU 51 fetches the control program PG in the external ROM 60 via the bus 53 and executes the control program PG. The external ROM 60 is normally a general purpose ROM. Therefore, in many cases, the external ROM 60 can be accessed only at a very low speed, compared to an internal ROM. The external ROM 60 is formed of, for example, a rewritable, general purpose flush ROM.

FIG. 10 is a block diagram illustrating a third known example which allows a high-speed operation. In a configuration shown in FIG. 10, a microcomputer 50B includes a cache RAM 54 and a cache circuit 55 and has a configuration of a so-called "cache microcomputer". The MPU 51 fetches the control program PG of the external ROM 60 via the bus 53 and executes the control program PG. However, the access speed of the external ROM 60 is low, and data for an address which is frequently accessed is dynamically registered in the cache RAM 54. Then, the cache circuit 55 switches between accessing the external ROM 60 and accessing the cache RAM 54.

Problems That the Invention is to Solve

However, with the known configurations, the following problems arise.

As in the first known example, when a system with an internal ROM uses a masked ROM as the internal ROM, it is very difficult to correspond to requests for avoiding risks such as program problems, which have recently increased. Moreover, when a rewriteable ROM is used as the internal ROM, process steps for fabricating a microcomputer has to include different process steps for a logic circuit and a rewritable ROM (i.e., so called an "embedded process"), thus resulting in very high costs.

Moreover, as in the second known example, in a system using an external ROM, the access speed is much lower than that of a system using an internal memory. Therefore, in the case of control requiring a high-speed operation, it is very difficult to achieve a stable operation.

Moreover, as in the third known example, when a cache microcomputer is used, a high-speed operation can be achieved. However, the configuration of the mechanism for a cache becomes very large scale and complicated. Therefore, for example, for a built-in microcomputer, such a mechanism might be too excessive and also costs might become too expensive.

SUMMARY OF THE INVENTION

It is therefore an object of the present invention to allow, in a microcomputer application system, part of the program requiring high-speed operation to be operated at high speed with a simple configuration.

Specifically, according to the present invention, a high-speed operation requiring processing part (which will be herein referred to as "high-speed processing part") which is part of a program stored in a ROM and is required to be operated at high speed is transferred from the ROM to a RAM having a higher access speed by an MPU, and then, when a fetch address which an MPU specifies to fetch program data indicates a region of the ROM in which the high-speed processing part is stored, the fetch address is translated to the address of a region of the RAM corresponding to the high-speed processing part. More specifically, the high-speed processing part stored in the ROM is transferred to the RAM having a high access speed, accessed by the MPU, and executed. Furthermore, the present invention does not require a complicated configuration such as a cache mechanism but is realizable by the function of transferring a program and the function of translating an address. Therefore, partial high-speed operation can be achieved with a simple configuration.

Moreover, the high-speed processing part can be stored in the ROM together with another program which can be executed at low speed. Therefore, software can be flexibly rewritten and thus software development can be simplified.

Moreover, the present invention provides a signal processing system including a signal processing LSI for executing a program by an operation processing unit such as a DSP having the same technical features as those described above. Specifically, in a configuration in which the operation processing unit is accessible to a first storage unit and a second storage unit having a lower access speed than that of the first storage unit, a high-speed processing part which is part of a program stored in the second storage unit and is required to be operated at high speed is transferred from the second storage unit to the first storage unit, and then when a fetch address which the operation processing unit specifies to fetch program data indicates a region of the second storage unit in which the high-speed processing part is stored, the fetch address is translated to the address of a region of the second storage unit corresponding to the high-speed processing part. More specifically, the high-speed processing part stored in the second storage unit is transferred to the first storage unit having a high access speed, accessed by the operation processing unit, and executed. Furthermore, the present invention does not require a complicated configuration such as a cache mechanism but is realizable by the

DESCRIPTION OF THE PREFERRED EMBODIMENTS

Hereinafter, embodiments of the present invention will be described with reference to the accompanying drawings.

(First Embodiment)

Figure 1:
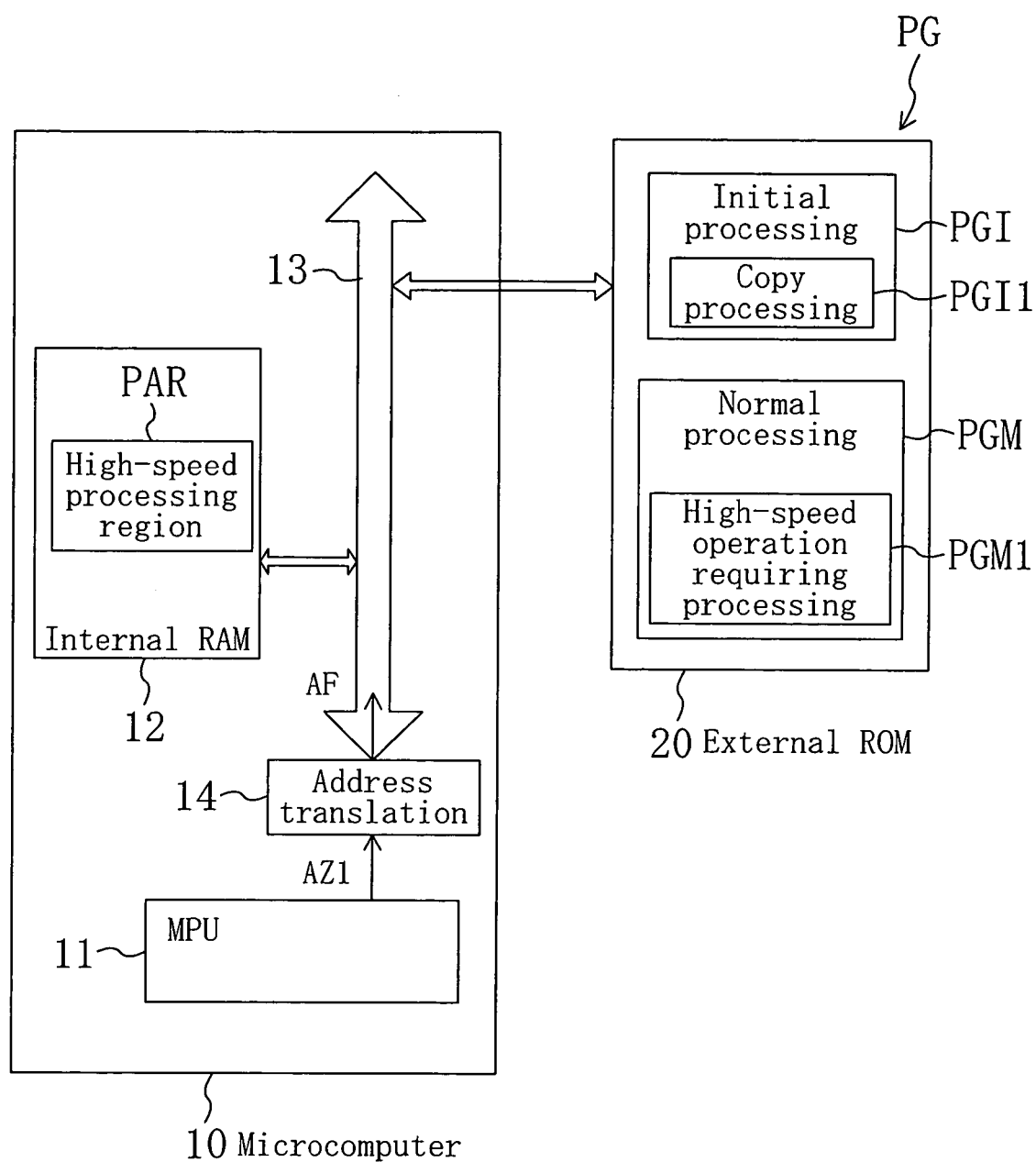
FIG. 1 is a block diagram illustrating the configuration of a microcomputer application system according to a first embodiment of the present invention.

FIG. 1 is a block diagram illustrating the configuration of a microcomputer application system according to a first embodiment of the present invention. In FIG. 1, a microcomputer 10 includes an MPU 11, an internal RAM 12, and a bus 13 for connecting the MPU 11 and the internal RAM 12. Moreover, the reference numeral 20 denotes an external ROM connected to the bus 13 of the microcomputer 10.

In the external ROM 20, a program PG for controlling the microcomputer 10 is stored. The program PG includes two separate parts, i.e., an initial processing part PGI which is executed after a reset release and a normal processing part PGM which is executed in a normal state. The normal processing part PGM has a high-speed operation requiring processing part (which will be herein referred to as "high-speed processing part") PGM1 which is required to be operated at high speed. The initial processing part PGI has a copy processing part PGI1 for copying the high-speed processing part PGM1 to a high-speed processing region PAR of the internal RAM 12.

The microcomputer 10 includes an address translation unit 14 for translating, as necessary, a fetch address AZ1 which the MPU 11 specifies to fetch program data. More specifically, the address translation unit 14 as second means translates the fetch address AZ1 to the address AF of a region of the internal RAM 12 corresponding to the high-speed processing part PGM1 when the fetch address AZ1 indicates a region of the external ROM 20 in which the high-speed processing part PGM1 is stored. The address translation unit 14 is formed of, for example, hardware.

Figure 2:
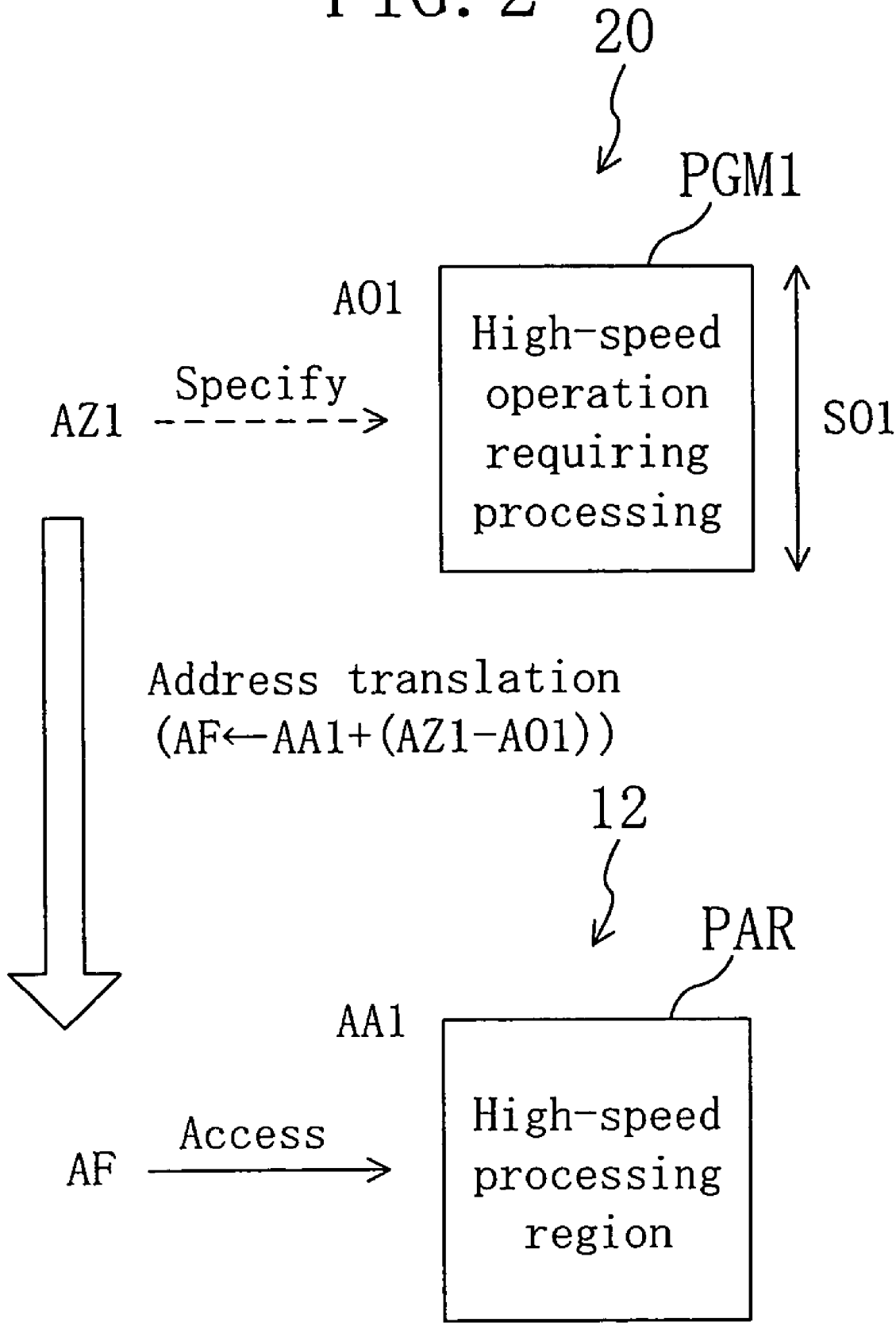
FIG. 2 is a diagram illustrating address translation in an embodiment of the present invention.

Address translation in this embodiment will be described with reference to FIG. 2. Now, assume that the top address of the high-speed processing part PGM1 stored in the external ROM 20 is AO1, the size of the high-speed processing part PGM1 in the internal RAM 12 is SO1, and the top address of the high-speed processing region PAR is AA1. Then, it is determined whether or not the fetch address AZ1 indicates the high-speed processing part PGM1 stored in the external ROM 20, using the following equation.

$$AO1 \leq AZ1 < AO1+SO1 \qquad \text{[Equation 1]}$$

It can be determined that when Equation 1 is true, the fetch address AZ1 indicates the high-speed processing part PGM1 and when Equation 1 is false, the fetch address AZ1 does not indicate the high-speed processing part PGM1. When Equation 1 is true, address translation is performed using the following equation.

$$AF \leftarrow AA1+(AZ1-AO1) \qquad \text{[Equation 2]}$$

When Equation 1 is not true, the fetch address AZ1 is not translated but used as it is. Specifically, when the fetch address AZ1 indicates the region of the external ROM 20 in which the high-speed processing part PGM1 is stored, the high-speed processing part PGM1 transferred to the internal RAM 12 can be accessed through the address translation expressed by the following equation.

$$AF \leftarrow AZ1 \qquad \text{[Equation 3]}$$

Accordingly, partial high-speed operation can be reliably achieved.

Hereinafter, an operation of the microcomputer application system of FIG. 1 will be described. First, after a reset release, the MPU 11 sequentially accesses the external ROM 20 via the bus 13 and, at the same time, executes the initial processing part PGI. At this time, the MPU 11 executes the copy processing part PGI1, thereby copying the high-speed processing part PGM1 of the program PG stored in the external ROM 12 to the high-speed processing region PAR of the internal RAM 12. That is to say, first means of the present invention is achieved by the MPU 11 and the copy processing part PGI1.

Thereafter, the MPU 11 executes the normal processing part PGM. In this case, when the fetch address AZ1 of program data required by the MPU 11 indicates other part than the high-speed processing part PGM1 and Equation 1 is false, the address translation unit 14 outputs as the address AF the fetch address AZ1 as it is. Thus, the address space of the external ROM 20 is specified and the microcomputer 10 is operated according to the normal processing part PGM.

Next, when control by the microcomputer 10 reaches as far as the high-speed processing part PGM1, the fetch address AZ1 output by the MPU 11 indicates the high-speed processing part PGM1. In this case, Equation 1 is true and therefore the address translation unit 14 translates the fetch address AZ1 to the address AF according to Equation 2. Thus, the address space of the internal RAM 12 is specified and the microcomputer 10 is operated according to the high-speed processing part PGM1 copied to the high processing region PAR.

As has been described, according to this embodiment, the high-speed processing part PGM1 stored in the external ROM 20 is copied to the internal RAM 12. Then, when the MPU 11 accesses the high-speed processing part PGM1, an element from which program data is fetched can be switched from the external ROM 20 to the internal RAM 12. Thus, even if the high-speed processing part PGM1 is stored in the external ROM 20 with another part of the normal processing part PGM which is sufficiently operated at low speed, high speed processing can be performed.

For example, as for Matsushita's microcomputer MN 103 series and MN 102 series, a program in the external ROM having a data bus of 8 bits and an access time of 125 ns can be operated at about 4 MIPS. In contrast, a program in the internal RAM 12 is operable at about 20 MIPS in the MN 103 series and at about 10 MIPS in the MN 102 series. Therefore, remarkable effects can be obtained by this embodiment.

As a comparative example to this embodiment, a configuration in which without the address translation function provided in a microcomputer, a program required to be operated at high speed is copied to the internal RAM can be formed. In this configuration, a data image which is to be an implementable program when being copied to the internal RAM is stored in an external ROM, and then the data image is copied from the external ROM to the internal RAM to be operated. That is to say, this system configuration requires considerations to software.

However, with the configuration according to the comparative example, the following problem arises. Specifically, since the high-speed processing part is formed as a program to be fetched from the internal RAM, the high-speed processing part is a mere data image while being stored in the external ROM. Therefore, when the data image is fetched as a program, a microcomputer might go runaway. Moreover, a program has to be developed taking it into consideration that the high-speed processing part is operated on the internal RAM having a different address from that of the external ROM, thus resulting in a big burden on a developer.

On the other hand, in this embodiment, the fetch address AZ1 is translated in the microcomputer 10, and thus a software developer does not have to worry about the internal configuration of the microcomputer 10. Therefore, the software developer can develop software as in the same manner as in developing a program operable on the known external ROM 20. It is necessary to specify a region of the program PG required to be operated at high speed. But, this is not very difficult for a system developer. Furthermore, using a recent compiler technique, processing modules requiring high-speed operation can be collectively provided in a specific block. Accordingly, burdens on the software developer can be reduced.

Note that a program for copying the high-speed processing part PGM1 may be stored inside of the microcomputer 10, for example, in the internal RAM 12.

(Second Embodiment)

Figure 3:
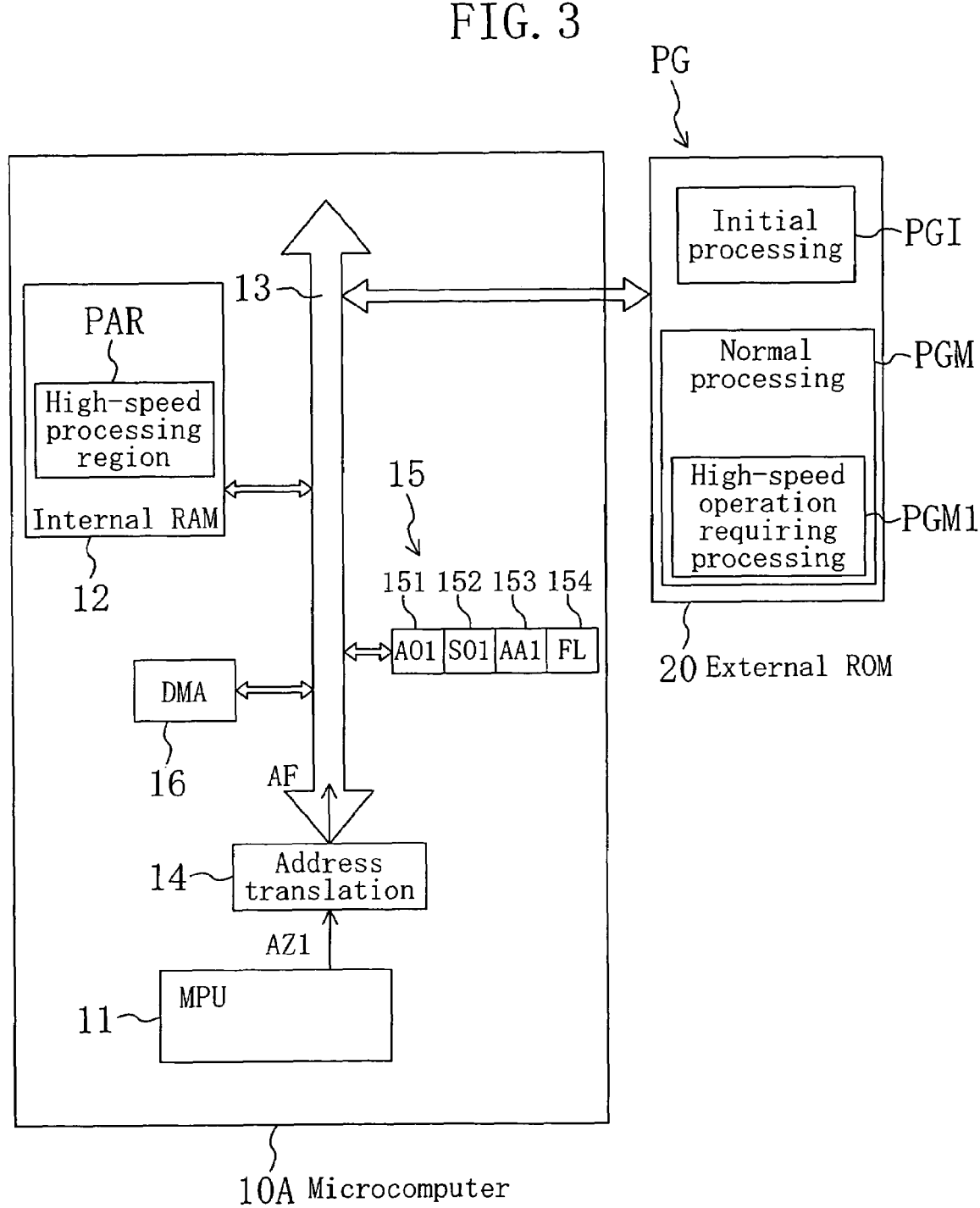
FIG. 3 is a block diagram illustrating the configuration of a microcomputer application system according to a second embodiment of the present invention.

FIG. 3 is a block diagram illustrating the configuration of a microcomputer application system according to a second embodiment of the present invention. In FIG. 3, each member also shown in FIG. 1 is identified by the same reference numeral and therefore the description thereof will be omitted. The configuration of FIG. 3 is different from that of FIG. 1 in that a microcomputer 10A includes a DMA circuit 16 as first means and a register 15 which can set a condition for determining whether or not address translation is needed. The address translation unit 14 and register 15 together form second means.

First, in this embodiment, the DMA circuit 16 transfers the high-speed processing part PGM1 stored in the external ROM 20 to the internal RAM 12. Therefore, the initial processing part PGI does not have to include the copy processing part PGI1. With the DMA circuit 16 provided, while the high-speed processing part PGM1 is transferred to the internal RAM 1, the MPU 11 can execute other processing in parallel. Thus, compared to the first embodiment, time which it takes from a reset release to shift to the normal processing part PGM can be reduced, by an amount expressed by:

Reduced time=the number of high-speed blocks×
ROM size×(ROM read cycle+microcomputer
processing time)

Moreover, the register 15 includes first and second regions 151 and 152 in which the top address AO1 and size SO1 of the high-speed processing part PGM1 are stored, respectively, and a third region 153 in which the top address AA1 of high-speed processing region PAR of the internal RAM 12 is stored, and a fourth region 154 in which a flag FL indicating whether or not the high-speed processing part PGM1 has been transferred is stored. The register 15 is referred to when the DMA circuit 16 transfers the high-speed processing part PGM1 to the internal RAM 12 and also when the address translation unit 14 translates the fetch address AZ1.

In this case, the top address AA1 of the high-speed processing region PAR of the internal RAM 12 is set to be in the register 15, thereby increasing the degree of freedom of a region to which the high-speed processing part PGM1 is transferred. Specifically, whatever location in the internal RAM 12 the high-speed processing part PGM1 is arranged, the fetch address AZ1 can be accurately translated as long as the top address of the high-speed processing part PGM1 is stored in the third region 153 of the register 15. Moreover, if another memory which is accessible at high speed is provided, the high-speed processing part PGM1 may be arranged in the memory. Note that it does not have to be the top address of the high-speed processing region PAR but may be any data indicating a region in which the high-speed processing region PAR is arranged that is stored in the register 15.

Moreover, the top address AO1 of the high-speed processing part PGM1 is set to be in the register 15, so that the high-speed processing part PGM1 may be arranged in any region in the external ROM 20. That is to say, development of developer-friendly, high-degree-of-freedom software becomes possible. Note that it does not have to be the top address of the high-speed processing part PGM1 but may be any data indicating a region in which the high-speed processing part PGM1 is stored that is stored in the register 15.

Moreover, by making it possible to set the size SO1 of the high-speed processing part PGM1 to be in the register 15, transfer processing of the high-speed processing part PGM1 can be optimized to be a necessity minimum. Accordingly, futile processing time can be reduced, so that the overhead of processing which is executed in parallel with normal processing can be reduced. Moreover, the capacity of the high-speed processing region PAR can be optimized. Therefore, the RAM can be effectively used for another purpose.

Note that each of the top address and size of the high-speed processing part PGM1 to be stored in the register 15 do not have to be based on a function unit, i.e., 1 module, but can be set to be part of a module or to extend over two or more function modules. The high-speed processing part PGM1 means to be part of a program which is desired to be operated at high speed.

Furthermore, by storing the flag FL in the register 15, the address translation unit 14 can recognize whether or not the high-speed processing part PGM1 has been transferred in a simple manner. Specifically, in this embodiment, the address translation unit 14 determines whether or not to translate the fetch address AZ1 based on the following equation.

$$AO1 \leq AZ1 < AO1+SO1 \ \&\& \ FL=\text{transferred} \qquad [\text{Equation 4}]$$

Specifically, when the high-speed processing part PGM1 has been already transferred, the address translation unit 14 is operated in the same manner as in the first embodiment. However, when copy of the high-speed processing part PGM1 has not been completed, the flag FL stored in the fourth region 154 of the register 15 indicates an untransferred state. Thus, the condition of Equation 4 is false. In this case, the address translation unit 14 does not translate the fetch address AZ1 and outputs the fetch address as it is, according to Equation 3. Thus, the address space of the external ROM is selected and the microcomputer 10 executes the high-speed processing part PGM1 stored in the external ROM 20. By this operation, even if transfer of the high-speed processing part PGM1 by the DMA circuit 16 has not completed at the start of execution of the high-speed processing part PGM1 by the microcomputer 10A in a normal operation, the high-speed processing part PGM1 can be executed without waiting for the transfer to be completed and also without causing any malfunction.

(Third Embodiment)

Figure 4:
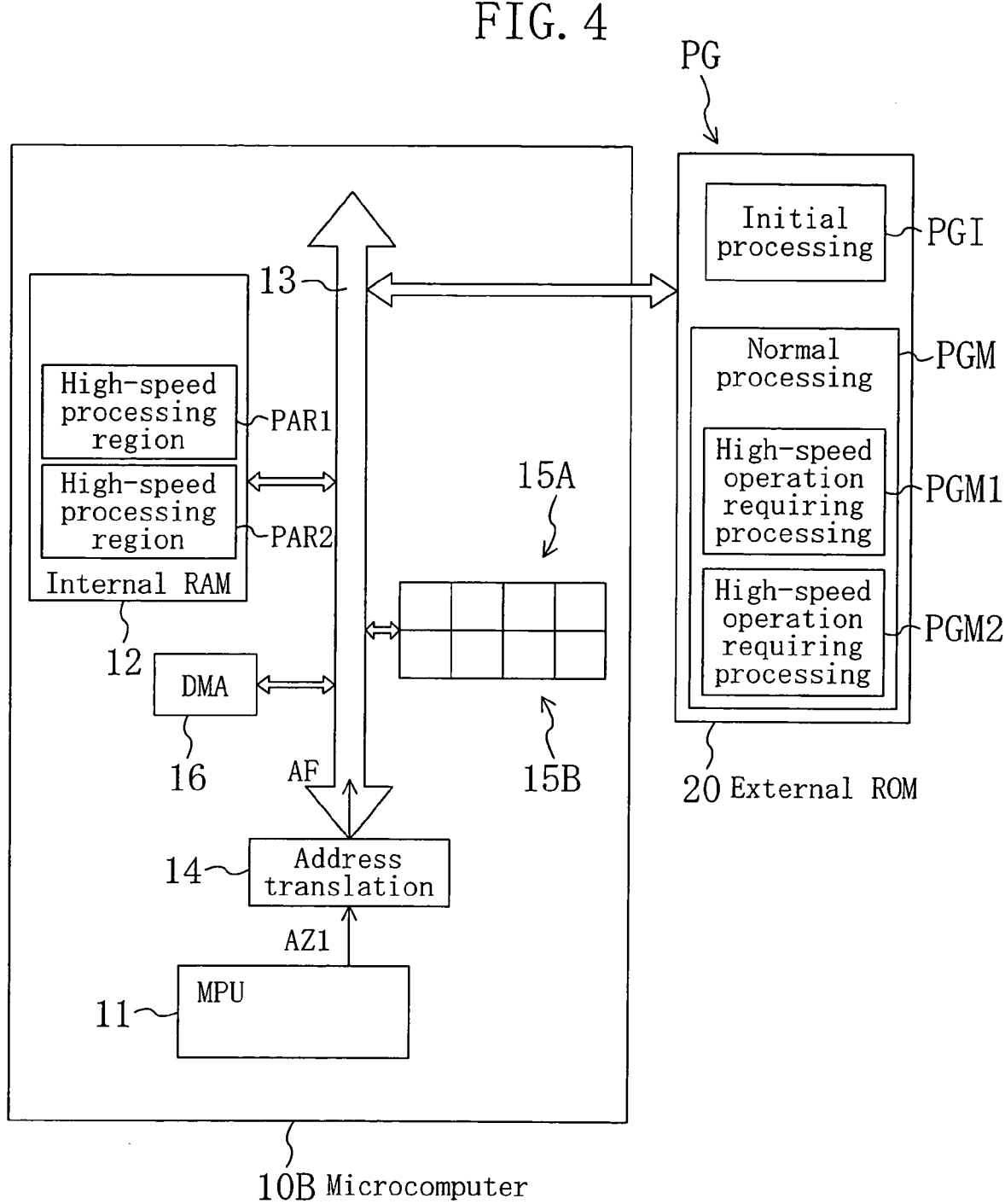
FIG. 4 is a block diagram illustrating the configuration of a microcomputer application system according to a third embodiment of the present invention.

FIG. 4 is a block diagram illustrating the configuration of a microcomputer application system according to a third embodiment of the present invention. In FIG. 4, each member also shown in FIG. 1 and FIG. 3 is identified by the same reference numeral. The configuration of FIG. 4 is different from that of FIG. 3 in that a plurality of registers (two of them are shown in FIG. 4) which can set conditions for determining whether or not address translation is needed are provided. The address translation unit 14 and the first and second registers 15A and 15B together form the second means.

Operation performed in this embodiment is basically the same as that in the second embodiment. However, it is possible to set a determination condition for each of a plurality of high-speed processing parts PGM1 and PGM2. Specifically, the first register 15A is provided so as to correspond to the first high-speed processing part PGM1 in the program PG and the second register 15B is provided so as to correspond to the second high-speed processing part PGM2. The DMA circuit 16 copies the first and second high-speed processing parts PGM1 and PGM2 to high-speed processing regions PAR1 and PAR2, respectively, in the internal RAM 12.

In this manner, the plurality of registers for setting a determination condition are provided, so that it is possible to deal with the plurality of high-speed processing parts scatteredly arranged. For example, control of an optical disc device includes a plurality of processings requiring high-speed operation such as interrupt processing and time-restricted processing. When control of an optical disc device is achieved by a microcomputer, this embodiment is particularly effective. Moreover, assume that a high-speed processing part includes a shared portion which does not depend on the operation state of the microcomputer 10B and an individual portion which switches depending on the operation state of the microcomputer 10B. Even in such a case, the present invention can be applied in a simple manner in which each of a plurality of registers is provided so as to correspond to the individual portion and the registers are switched around according to switching of the individual portion. Therefore, development of more developer-friendly, high-degree-of-freedom software becomes possible.

Figure 5:
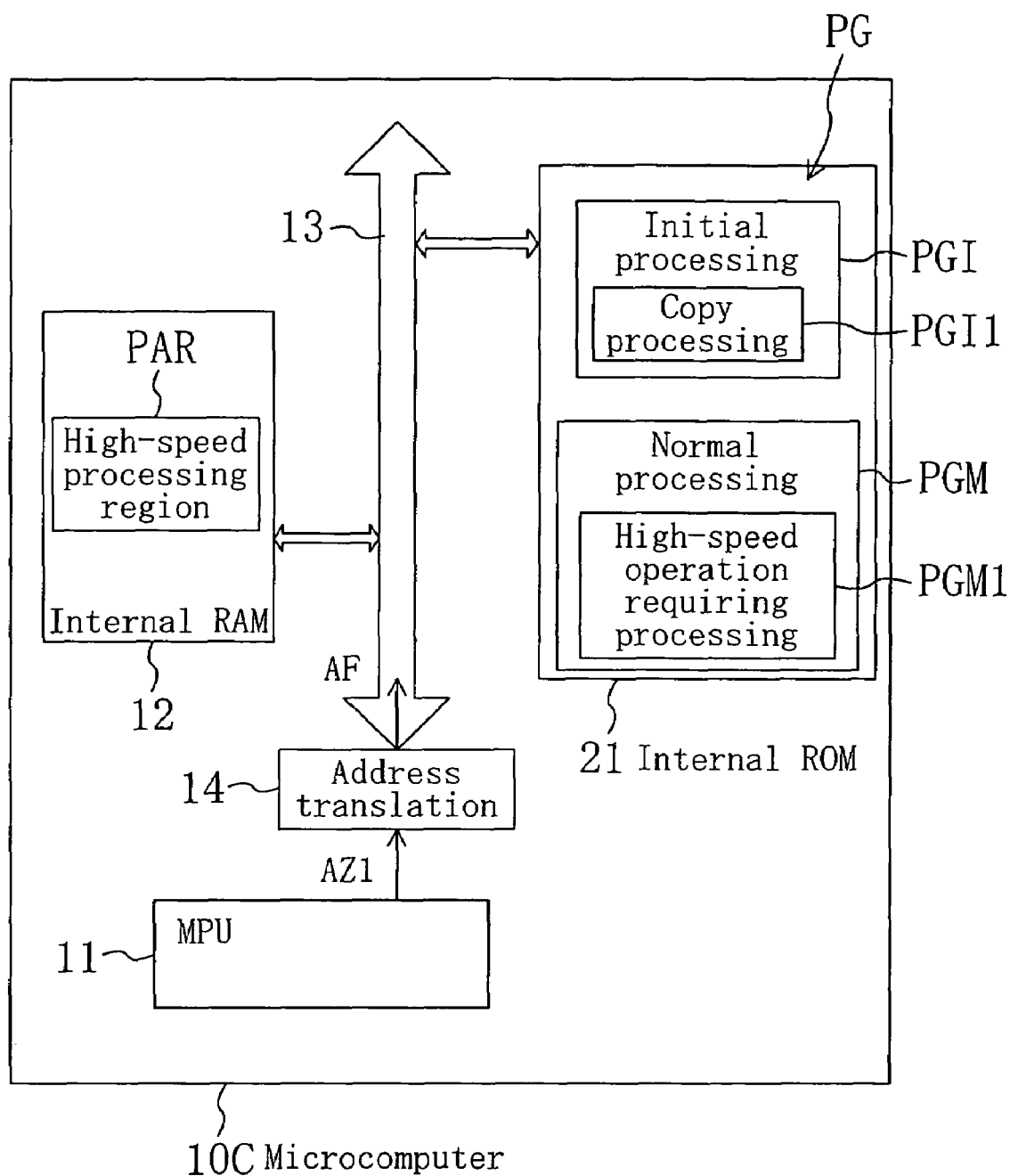
FIG. 5 is a block diagram illustrating another exemplary configuration of the microcomputer application system of the present invention.

Note that in each of the above-described embodiments, description has been made using a microcomputer application system including a combination of a microcomputer and an external ROM as an example. However, the present invention is not limited thereto. For example, a configuration in which a microcomputer and an external ROM are provided in a single package or a configuration in which a ROM is provided inside of a microcomputer may be used. That is to say, if a program is stored in a memory having a lower operating speed than that of an internal RAM, effects of the present invention can be obtained. FIG. 5 is a block diagram illustrating another example of a microcomputer application system according to the present invention. FIG. 5 illustrates a configuration in which a microcomputer 10C includes an internal ROM 21 having a lower access speed by the MPU 11 than that of the internal RAM 12.

Figure 6:
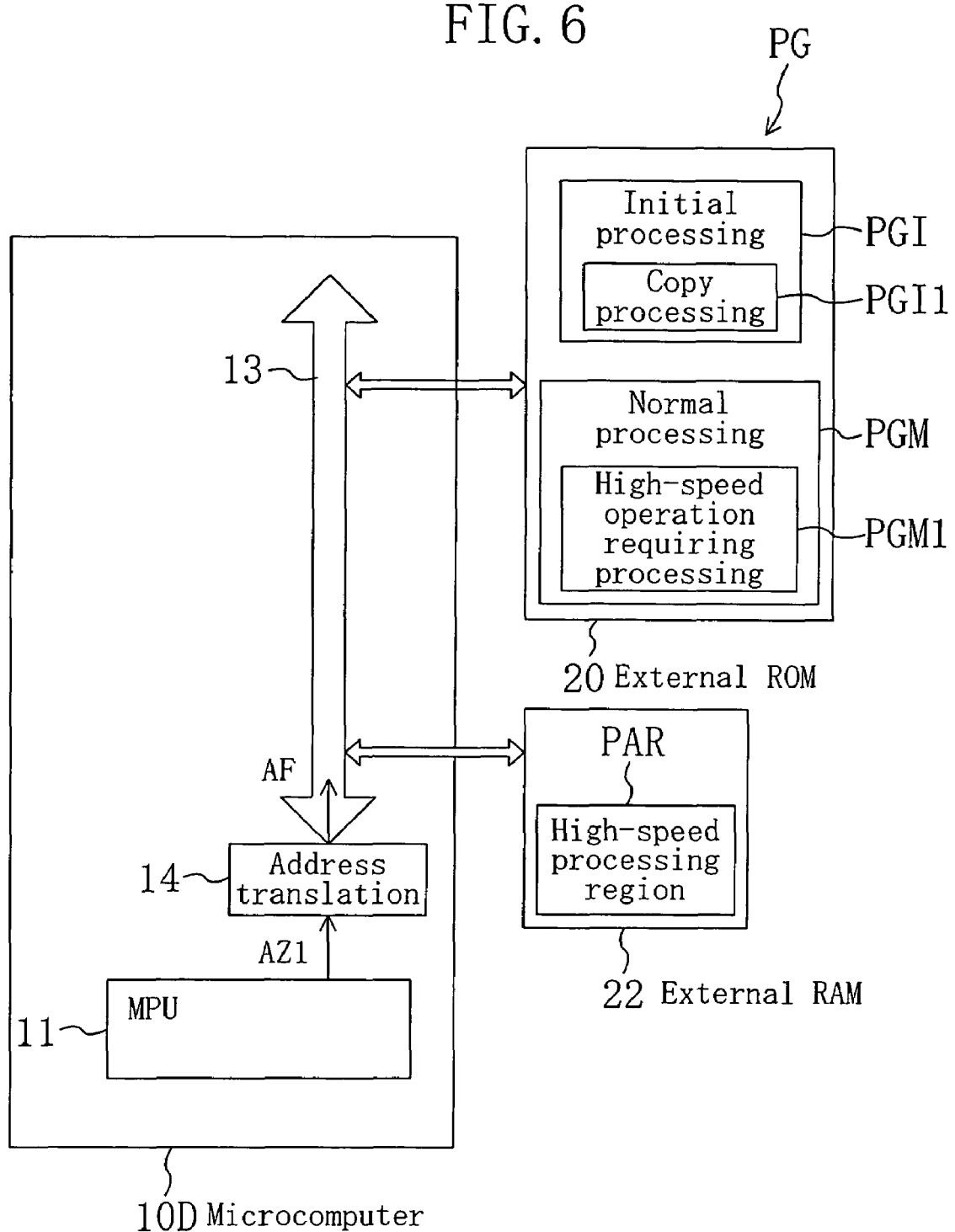
FIG. 6 is a block diagram illustrating another exemplary configuration of the microcomputer application system of the present invention.
Figure 7:
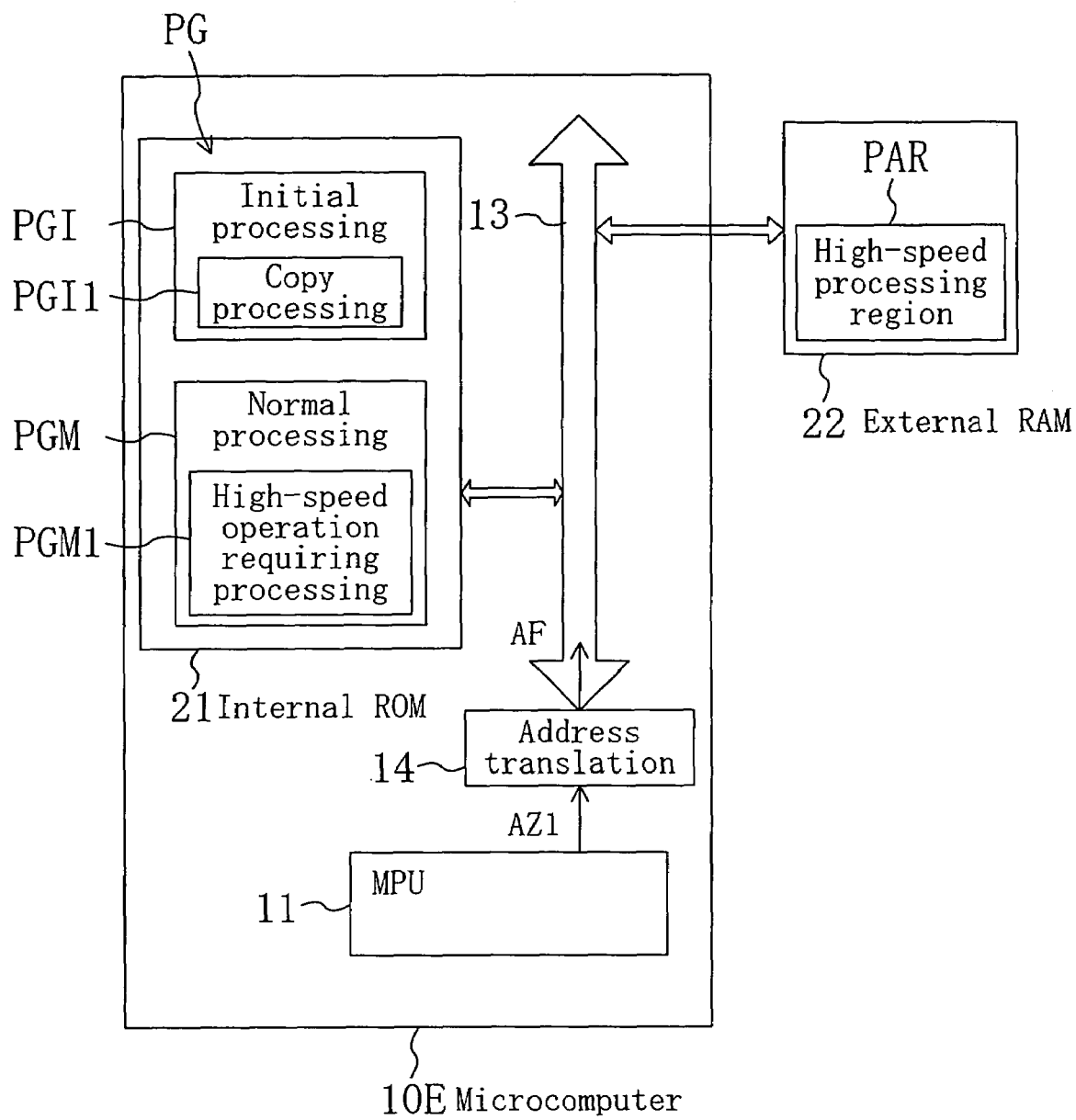
FIG. 7 is a block diagram illustrating another exemplary configuration of the microcomputer application system of the present invention.
Figure 8:
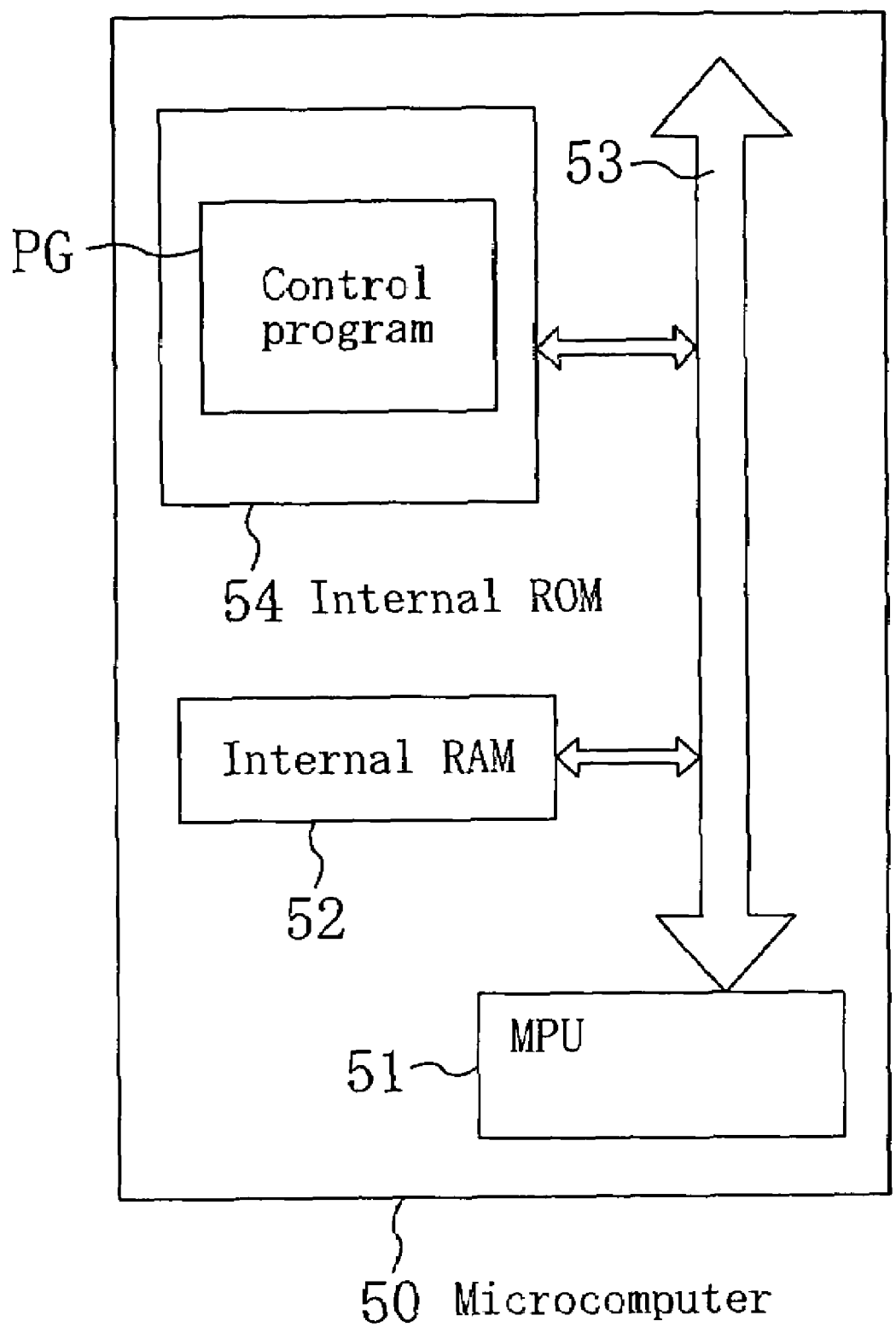
FIG. 8 is a block diagram illustrating a first known example.
Figure 9:
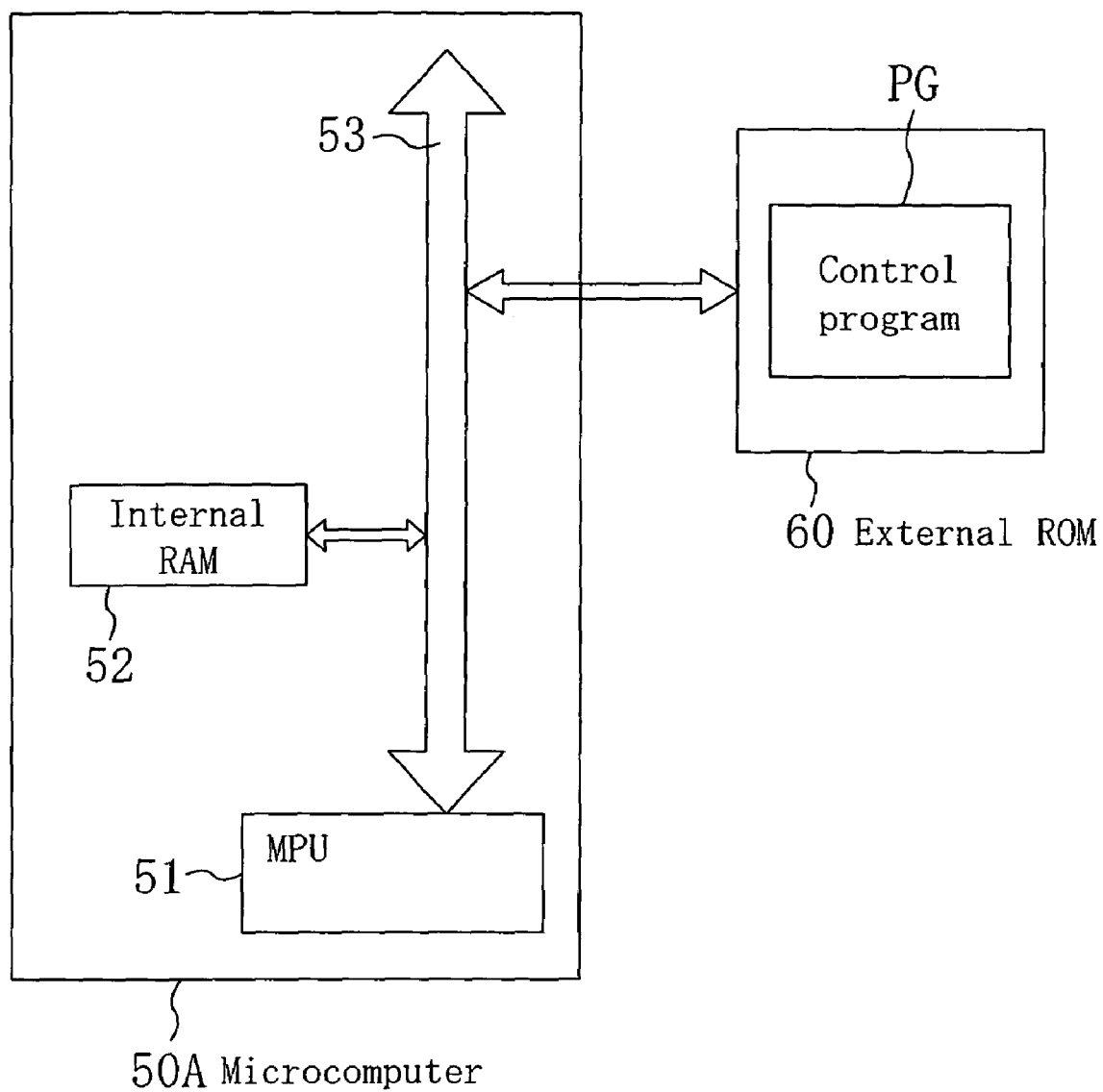
FIG. 9 is a block diagram illustrating a second known example.
Figure 10:
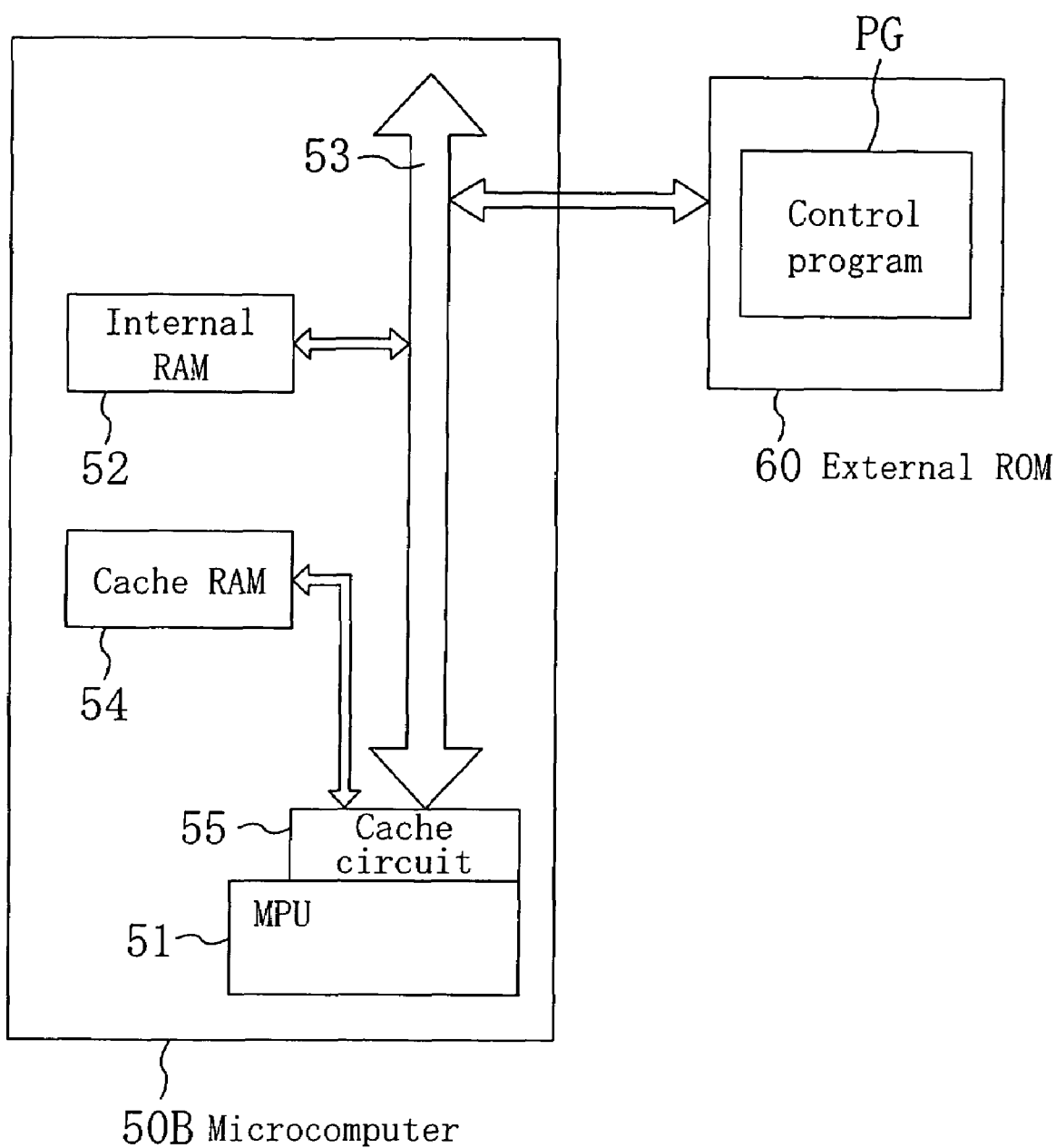
FIG. 10 is a block diagram illustrating a third known example.
Figure 11:
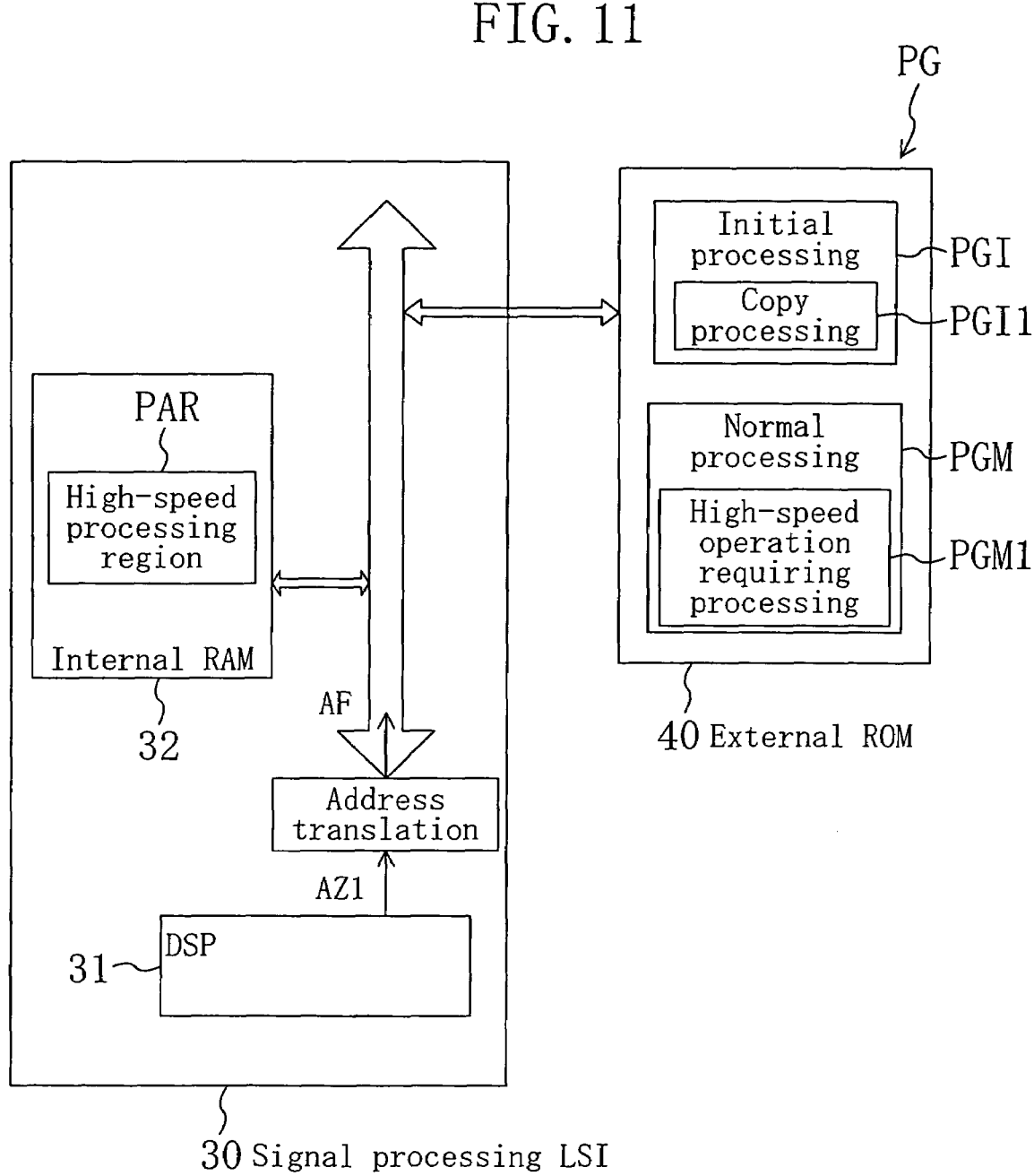
FIG. 11 is a block diagram illustrating an exemplary configuration of a signal processing system according to the present invention.
Figure 12:
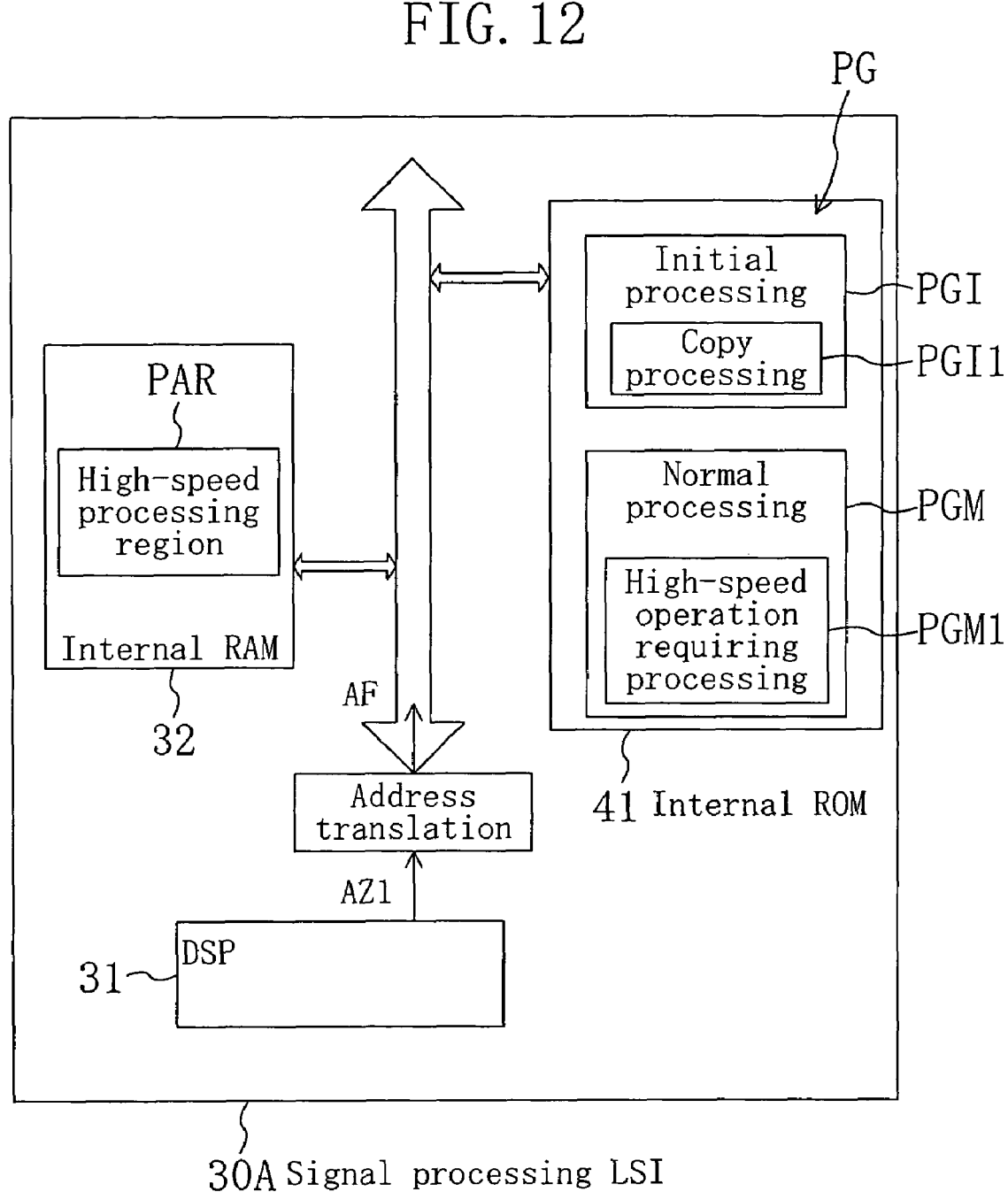
FIG. 12 is a block diagram illustrating another exemplary configuration of the signal processing system of the present invention.
Figure 13:
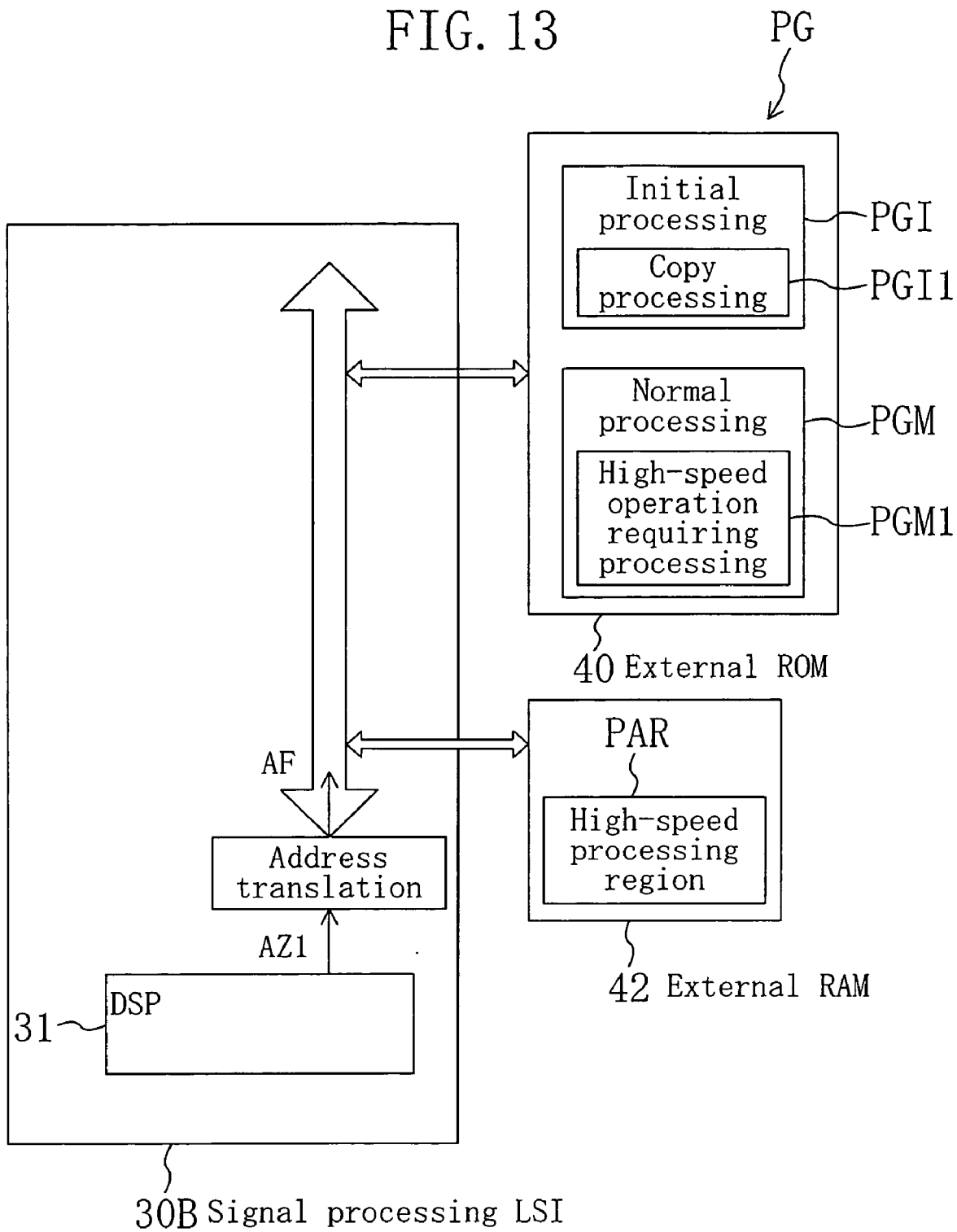
FIG. 13 is a block diagram illustrating another exemplary configuration of the signal processing system of the present invention.

Note that in each of the above-described embodiments, a high-speed processing part stored in a ROM is fetched into an internal RAM and is executed at high speed. However, the present invention is not limited thereto, but the high-speed processing part may be fetched into an external RAM. Specifically, with a RAM having a higher access speed than that of a memory in which a program is stored when processing is performed by an MPU, even if the RAM is externally provided, the effects of the present invention can be obtained. FIG. 6 is a block diagram illustrating still another example of the microcomputer application system of the present invention. FIG. 6 illustrates a configuration in which a microcomputer 10D is so configured to be connectable not only to an external ROM 20 but also to an external RAM 22. Moreover, FIG. 7 is a block diagram illustrating yet another example of the microcomputer application system of the present invention. FIG. 7 illustrates a configuration in which a microcomputer 10E configured to be connectable to the external RAM 22 includes an internal ROM 21 having a lower access speed by the MPU 11 than that of the external RAM 22.

Moreover, each of the above-described embodiments, description has been made using a microcomputer application system including a microcomputer for executing a program by an MPU as an example. However, the present invention is not limited thereto. For example, even with a signal processing system in which the microcomputer of each of the embodiments is replaced with a signal processing LSI for executing a program by an operation processing unit such as a DPS (digital signal processor), the same effects as those of each of the embodiments can be obtained. Furthermore, the RAM and the ROM of each of the embodiments may be replaced with storage units having different access speeds. That is to say, if the operation processing unit is a signal processing system including a first storage unit and a second storage unit having a lower access speed than that of the first storage unit, high-speed processing of a program according to the present invention becomes possible.

Figure 14:
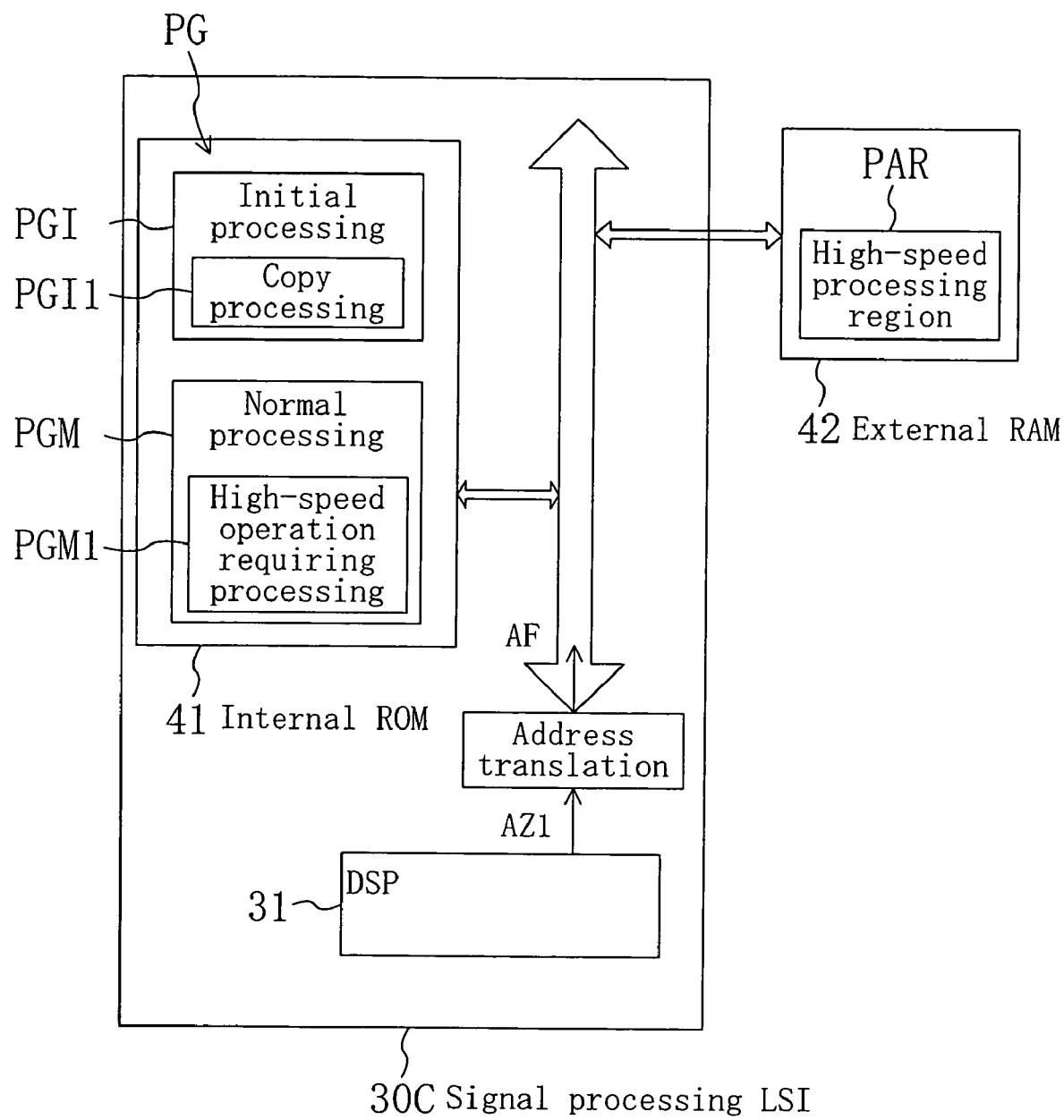
FIG. 14 is a block diagram illustrating another exemplary configuration of the signal processing system of the present invention.

FIGS. 11 through 14 are block diagrams each illustrating an exemplary configuration of a signal processing system according to the present invention. The signal processing system is operated in the same manner as each of those of FIG. 1 and FIGS. 5 through 7. In FIGS. 11 through 14, each of signal processing LSIs 30, 30A, 30B and 30C includes a DSP 31 as an operation processing unit for executing a program. In a configuration of FIG. 11, a RAM 32 as the first storage unit is provided in the signal processing LSI 30 and a ROM 40 as the second storage unit is externally provided. In a configuration shown in FIG. 12, a RAM 32 as the first storage unit and a ROM 41 as the second storage unit are provided in the signal processing LSI 30A. In a configuration shown in FIG. 13, a RAM 42 as the first storage unit and the ROM 40 as the second storage unit are externally provided to the signal processing LSI 30B. In FIG. 14, the RAM 42 as the first storage unit is externally provided to the signal processing LSI 30C and the ROM 41 as the second storage unit is provided in the signal LSI 30C.

As has been described, according to the present invention, the high-speed processing part stored in the ROM or the second storage unit is transferred to the RAM or the first storage unit having a high operating speed and then accessed by the MPU or the operation processing unit to be executed. Moreover, this operation is achievable by the function of transferring a program and the function of translating an address. Therefore, partially high-speed operation can be achieved with a simple configuration. Furthermore, the high-speed processing part can be stored in the ROM or the second storage unit together with another program which can be operated at low speed. Therefore, software can be flexibly rewritten, so that software development can be simplified.

What is claimed is:

1. A microcomputer application system comprising:
    a microcomputer including an MPU, an internal RAM, and a bus for connecting the MPU and the internal RAM;
    an external ROM connected to the bus;
    first means for transferring a high-speed processing part which is part of a program stored in the external ROM and is required to be operated at high speed from the external ROM to the internal RAM; and
    second means for translating, when a fetch address AZ1 which the MPU specifies to fetch program data indicates a region of the external ROM in which the high-speed processing part is stored, the fetch address AZ1 to an address AF of a region of the internal RAM corresponding to the high-speed processing part, and for not translating the fetch address AZ1, when the fetch address AZ1 does not indicate the region of the external ROM in which the high-speed processing part is stored; and
    a register referred to by the second means,
    wherein the register is operable to set a top address AO1 of the high-speed processing part stored in the external ROM and a top address AA1 of the high-speed processing part transferred to the internal RAM,
    wherein the second means translates the fetch address AZ1 to a value obtained by subtracting the top address AO1 from a sum of the top address AA1 and the fetch address AZ1 as the address AF with referring to the register, when the fetch address AZ1 indicates the region of the external ROM in which the high-speed processing part is stored.

2. The microcomputer application system of claim 1, wherein the MPU executes the program stored in the external ROM, thereby achieving the first means.

3. The microcomputer application system of claim 1, wherein the first means includes a DMA circuit for transferring the high-speed processing part from the external ROM to the internal RAM.

4. The microcomputer application system of claim 1, wherein the register is so configured that a flag indicating whether or not the high-speed processing part has been transferred to the internal RAM can be set.

5. The microcomputer application system of claim 1, wherein the register is operable to set a size SO1 of the high-speed processing part stored in the external ROM, and
    wherein the second means determines that the fetch address AZ1 indicates the region of the external ROM in which the high-speed processing part is stored, when the fetch address AZ1 is not less than the top address AO1 and is less than a sum of the top address AO1 and the size SO1.

6. A microcomputer which includes an MPU, an internal RAM, and a bus for connecting the MPU and the internal RAM and is so configured that an external ROM is connectable to the bus, the microcomputer comprising:
    first means for transferring a high-speed processing part which is part of a program stored in the external ROM and is required to be operated at high speed from the external ROM to the internal RAM, and
    second means for translating, when a fetch address AZ1 which the MPU specifies to fetch program data indicates a region of the external ROM in which the high-speed processing part is stored, the fetch address AZ1 to an address AF of a region of the internal RAM corresponding to the high-speed processing part, and for not translating the fetch address AZ1, when the fetch address AZ1 does not indicate the region of the external ROM in which the high-speed processing part is stored; and
    a register referred to by the second means,
    wherein the register is operable to set a top address AO1 of the high-speed processing part stored in the external ROM and a top address AA1 of the high-speed processing part transferred to the internal RAM,
    wherein the second means translates the fetch address AZ1 to a value obtained by subtracting the top address AO1 from a sum of the top address AA1 and the fetch address AZ1 as the address AF with referring to the register, when the fetch address AZ1 indicates the region of the external ROM in which the high-speed processing part is stored.

7. A microcomputer which includes an MPU, an internal RAM, and a bus for connecting the MPU and the internal RAM, the microcomputer comprising:
    a ROM which is connected to the bus and has a lower access speed by the MPU than that of the internal RAM;
    first means for transferring a high-speed processing part which is part of a program stored in the external ROM and is required to be operated at high speed from the external ROM to the internal RAM; and
    second means for translating, when a fetch address AZ1 which the MPU specifies to fetch program data indicates a region of the external ROM in which the high-speed processing part is stored, the fetch address AZ1 to an address AF of a region of the internal RAM corresponding to the high-speed processing part, and for not translating the fetch address AZ1, when the fetch address AZ1 does not indicate the region of the external ROM in which the high-speed processing part is stored; and a register referred to by the second means, wherein the register is operable to set a top address AO1 of the high-speed processing part stored in the ROM and a top address AA1 of the high-speed processing part transferred to the internal RAM, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the ROM in which the high-speed processing part is stored.

8. A microcomputer which includes an MPU and is so configured to be connectable to an external ROM and an external RAM, the microcomputer comprising:

first means for transferring a high-speed processing part which is part of a program stored in the external ROM and is required to be operated at high speed from the external ROM to the external RAM; and second means for translating, when a fetch address AZ1 which the MPU specifies to fetch program data indicates a region of the external ROM in which the high-speed processing part is stored, the fetch address AZ1 to an address AF of a region of the external RAM corresponding to the high-speed processing part, and for not translating the fetch address AZ1, when the fetch address AZ1 does not indicate the region of the external ROM in which the high-speed processing part is stored; and a register referred to by the second means, wherein the register is operable to set a top address AO1 of the high-speed processing part stored in the external ROM and a top address AA1 of the high-speed processing part transferred to the external RAM, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the external ROM in which the high-speed processing part is stored.

9. A microcomputer which includes an MPU and is so configured to be connectable to an external RAM, the microcomputer comprising;

a ROM having a lower access speed by the MPU than that of the external RAM;

first means for transferring a high-speed processing part which is part of a program stored in the ROM and is required to be operated at high speed from the ROM to the external RAM; and second means for translating, when a fetch address AZ1 which the MPU specifies to fetch program data indicates a region of the ROM in which the high-speed processing part is stored, the fetch address AZ1 to an address AF of a region of the external RAM corresponding to the high-speed processing part, and for not translating the fetch address AZ1, when the fetch address AZ1 does not indicate the region of the ROM in which the high-speed processing part is stored; and a register referred to by the second means, wherein the register is operable to set a top address AO1 of the high-speed processing part stored in the ROM and a top address AA1 of the high-speed processing part transferred to the external RAM, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the ROM in which the high-speed processing part is stored.

10. A signal processing system comprising:

a signal processing LSI including an operation processing unit, an internal first storage unit, and a bus for connecting the operation processing unit and the first storage unit;

an external second storage unit which is connected to the bus and has a lower access speed by the operation processing unit than that of the first storage unit;

first means for transferring a high-speed processing part which is part of a program stored in the second storage unit and is required to be operated at high speed from the second storage unit to the first storage unit; and second means for translating, when a fetch address AZ1 which the operation processing unit specifies to fetch program data indicates a region of the second storage unit in which the high-speed processing part is stored, the fetch address AZ1 to an address AF of a region of the first storage unit corresponding to the high-speed processing part, and for not translating the fetch address AZ1, when the fetch address AZ1 does not indicate the region of the second storage unit in which the high-speed processing part is stored; and a register referred to by the second means, wherein the register is operable to set a top address AO1 of the high-speed processing part stored in the second storage unit and a top address AA1 of the high-speed processing part transferred to the first storage unit, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the second storage unit in which the high-speed processing part is stored.

11. The signal processing system of claim 10, wherein the operation processing unit executes the program stored in the second storage unit, thereby achieving the first means.

12. The signal processing system of claim 10, wherein the first means includes a DMA circuit for transferring the high-speed processing part from the second storage unit to the first storage unit.

13. The signal processing system of claim 10, wherein the register is so configured that a flag indicating whether or not the high-speed processing part has been transferred to the first storage unit can be set.

14. The signal processing system of claim 10, wherein the register is operable to set a size SO1 of the high-speed processing part stored in the second storage unit, and wherein the second means determines that the fetch address AZ1 indicates the region of the second storage unit in which the high-speed processing part is stored, when the fetch address AZ1 is not less than the top address AO1 and is less than a sum of the top address AO1 and the size SO1.

15. A signal processing LSI which includes an operation processing unit, an internal first storage unit, and a bus for connecting the operation processing unit and the first storage unit and is so configured that an external second storage unit having a lower access speed by the operation processing unit than that of the first storage unit is connectable to the bus, the LSI comprising:

first means for transferring a high-speed processing part which is part of a program stored in the second storage unit and is required to be operated at high speed from the second storage unit to the first storage unit; and second means for translating, when a fetch address AZ1 which the operation processing unit specifies to fetch program data indicates a region of the second storage unit in which the high-speed processing part is stored, the fetch address AZ1 to an address AF of a region of the first storage unit corresponding to the high-speed processing part, and for not translating the fetch address AZ1, when the fetch address AZ1 does not indicate the region of the second storage unit in which the high-speed processing part is stored; and a register referred to by the second means, wherein the register is operable to set a top address AO1 of the high-speed processing part stored in the second storage unit and a top address AA1 of the high-speed processing part transferred to the first storage unit, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the second storage unit in which the high-speed processing part is stored.

16. A signal processing LSI which includes an operation processing unit, an internal first storage unit, and a bus for connecting the operation processing unit and the first storage unit, the LSI comprising:

second storage unit which is connected to the bus and has a lower access speed by the operation processing unit than that of the first storage unit;

first means for transferring a high-speed processing part which is part of a program stored in the second storage unit and is required to be operated at high speed from the second storage unit to the first storage unit; and second means for translating, when a fetch address AZ1 which the operation processing unit specifies to fetch program data indicates a region of the second storage unit in which the high-speed processing part is stored, the fetch address AZ1 to an address AF of a region of the first storage unit corresponding to the high-speed processing part, and for not translating the fetch address AZ1, when the fetch address AZ1 does not indicate the region of the second storage unit in which the high-speed processing part is stored; and a register referred to by the second means, wherein the register is operable to set a top address AO1 of the high-speed processing part stored in the second storage unit and a top address AA1 of the high-speed processing part transferred to the first storage unit, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the second storage unit in which the high-speed processing part is stored.

17. A signal processing LSI which includes an operation processing unit and is so configured to be connectable to an external first storage unit and an external second storage unit having a lower access speed by the operation processing unit than that of the first storage unit, the LSI comprising:

first means for transferring a high-speed processing part which is part of a program stored in the second storage unit and is required to be operated at high speed from the second storage unit to the first storage unit; and second means for translating, when a fetch address AZ1 which the operation processing unit specifies to fetch program data indicates a region of the second storage unit in which the high-speed processing part is stored, the fetch address AZ1 to an address AF of a region of the first storage unit corresponding to the high-speed processing part, and for not translating the fetch address AZ1, when the fetch address AZ1 does not indicate the region of the second storage unit in which the high-speed processing part is stored; and a register referred to by the second means, wherein the register is operable to set a top address AO1 of the high-speed processing part stored in the second storage unit and a top address AA1 of the high-speed processing part transferred to the first storage unit, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the second storage unit in which the high-speed processing part is stored.

18. A signal processing LSI which includes an operation processing unit and is so configured to be connectable to an external first storage unit, the LSI comprising:

second storage unit having a lower access speed by the operation processing unit than that of the first storage unit;

first means for transferring a high-speed processing part which is part of a program stored in the second storage unit and is required to be operated at high speed from the second storage unit to the first storage unit; and second means for translating, when a fetch address AZ1 which the operation processing unit specifies to fetch program data indicates a region of the second storage unit in which the high-speed processing part is stored, the fetch address AZ1 to an address AF of a region of the first storage unit corresponding to the high-speed processing part, and for not translating the fetch address AZ1, when the fetch address AZ1 does not indicate the region of the second storage unit in which the high-speed processing part is stored; and a register referred to by the second means, wherein the register is operable to set a top address AO1 of the high-speed processing part stored in the second storage unit and a top address AA1 of the high-speed processing part transferred to the first storage unit, wherein the second means translates the fetch address AZ1 to a value obtained by subtracting the top address AO1 from a sum of the top address AA1 and the fetch address AZ1 as the address AF with referring to the register, when the fetch address AZ1 indicates the region of the second storage unit in which the high-speed processing part is stored.

\* \* \* \* \*